W. Davis.
Freezing Pan.

N°. 85,913.      Patented Jan. 19, 1869.

Witnesses.
J. Snowden Bell.
Henry K. Mygatt

Inventor.
William Davis
By Newton Crawford
Attorney

UNITED STATES PATENT OFFICE.

WILLIAM DAVIS, OF DETROIT, MICHIGAN.

Letters Patent No. 85,913, dated January 19, 1869.

IMPROVEMENT IN FREEZING-BOX FOR FISH, &c.

The Schedule referred to in these Letters Patent and making part of the same.

*To all whom it may concern:*

Be it known that I, WILLIAM DAVIS, of Detroit, in the county of Wayne, in the State of Michigan, have invented a new and improved Freezing-Box or Pan for Freezing Fish and Meats; and I do hereby declare that the following is a full and exact description thereof, reference being had to the accompanying drawings, and to the letters of reference marked thereon.

My invention consists in the construction of a thin sheet-metal pan or box in two sections or parts, one made to slide over the other, the object being to place the fish or meat into one part of the box or pan, and slide the cover, or the other part of the box, on to or in contact with the thing to be frozen, in order that the box, when placed in the freezing-chamber, and in contact with the freezing-mixture, may have its contents quickly frozen. By reason of having the box so constructed, it is capable of expanding or contracting, to accommodate the size of whatever may be placed in the box or pan, and the top and bottom always be in contact with the thing to be frozen.

To enable others skilled in the art to make and use my invention, I will describe its construction and operation.

Figure 1:
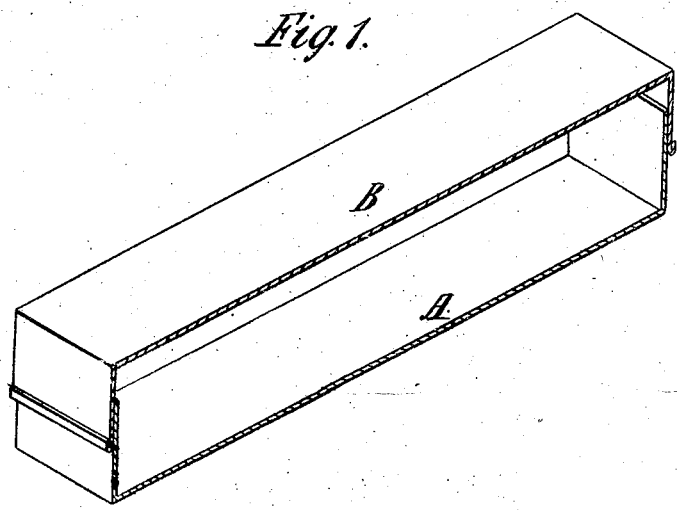
Figure 2:
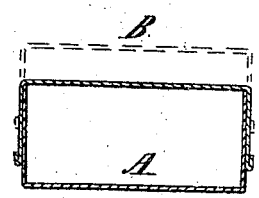

Figure 1 represents a section of my box or pan in perspective, purposely left open at the side, and Figure 2 is a cross-section, showing the two parts, in which A represents the bottom part, made of galvanized sheet-tin or galvanized iron; and B, the top or cover of the same metal.

The bottom part of the box A is made in quadrangular form, with the sides and ends extending high enough to receive the smallest size of fish, or thing to be frozen; and the cover or lid B is made in the same manner and form, but just enough larger to closely slide over the part A, and on to whatever is placed in part A to be frozen.

Fig. 2 represents the box in blue color, when it is contracted to its smallest capacity, and the red lines show the cover raised, so that a larger fish, or thing may be placed therein, which construction obviates the necessity of having so many different sizes of boxes, to accommodate the different sizes of things to be frozen.

It is necessary, for a more complete operation of freezing the contents of the box, that the sides, or top and bottom of the box should always be in contact with the thing frozen, and especially so in freezing fish, which should be frozen as quickly as possible after being taken from the water, in order to a more perfect preservation, and for long keeping after being frozen.

It is a well-known fact that fish frozen immediately after being taken from the water alive, can be kept frozen for a long time, and when placed in water again, and slowly thawed, the fish so frozen, will return to life and animation again.

It is also well known that when fish are frozen, they can be more easily and thoroughly scaled and dressed than when not frozen.

The size of the box is to be varied according to the size of what is to be frozen in it, but of such size that the cover will always come in contact with the contents.

After the fish or other thing to be frozen is placed in the box, as above described, the box, with the fish, is placed in a freezing-chamber, or in any box or chest, in layers, covering each layer with any freezing-mixture, one inch, more or less, in depth, until the chamber or box is filled with the freezing-boxes or pans and freezing-mixture. Ice and salt are commonly used as the freezing-mixture, but any other mixture that will freeze the fish, will answer as well.

When the fish or other things are sufficiently frozen and solid, which usually requires from thirty to fifty minutes, they should be taken out of the freezing-box or pan, and placed in a keeping-chamber or house, where the temperature is constantly kept from six to ten degrees below the freezing-point, where they can safely be kept as long as desired.

It will be seen that this construction of freezing-box or pan is necessary in order to keep the freezing-mixture from entering the box where the fish is, when it melts, as more or less of it will, which would, if permitted to enter the box, damage the contents and render them worthless.

I am aware that boxes made of paper and wood have been constructed so that one part freely slides over the other, and I do not broadly claim such box, as it would not answer my purpose; but What I do claim, and desire to secure by Letters Patent, is—

The freezing-box or pan, when constructed and used in the manner and for the purposes substantially as herein described.

WILLIAM DAVIS.

Witnesses:
HENRY N. MYGATT,
NEWTON CRAWFORD.